US009180957B2

(12) United States Patent
Weber et al.

(10) Patent No.: US 9,180,957 B2
(45) Date of Patent: Nov. 10, 2015

(54) METHOD FOR INSTALLING A DOME-SHAPED PRESSURE BULKHEAD IN A REAR SECTION OF AN AIRCRAFT, AND DEVICE FOR CARRYING OUT THE METHOD

(75) Inventors: Frank Weber, Jork (DE); Olaf Schoenfeldt, Hohenfelde (DE)

(73) Assignee: Airbus Operations GmbH, Hamburg (DE)

( * ) Notice: Subject to any disclaimer, the term of this patent is extended or adjusted under 35 U.S.C. 154(b) by 434 days.

(21) Appl. No.: 12/983,629

(22) Filed: Jan. 3, 2011

(65) Prior Publication Data

US 2011/0179626 A1 Jul. 28, 2011

Related U.S. Application Data

(63) Continuation of application No. PCT/EP2009/057812, filed on Jun. 23, 2009.

(60) Provisional application No. 61/134,141, filed on Jul. 7, 2008.

(30) Foreign Application Priority Data

Jul. 7, 2008 (DE) .......................... 10 2008 040 213

(51) Int. Cl.
*B64C 1/00* (2006.01)
*B23P 11/00* (2006.01)
(Continued)

(52) U.S. Cl.
CPC . *B64C 1/10* (2013.01); *B21J 15/14* (2013.01); *B64C 1/068* (2013.01); *B64C 1/069* (2013.01); (Continued)

(58) Field of Classification Search
CPC .......... B64C 1/10; B64C 1/069; B64C 1/068; B64F 5/0009; Y10T 29/49895; Y10T 29/49904; Y10T 29/49947; Y10T 29/49963; Y10T 29/49966; Y10T 29/534; Y10T 29/53417; Y10T 29/53913; Y10T 29/53961; Y10T 29/53917; Y10T 29/53974
USPC ............ 29/525.01, 525.11, 525.13, 464, 469, 29/791, 795, 271, 272, 281.1, 281.4; 244/119, 120, 121, 129.1, 131; 269/71, 269/73, 75, 55, 60, 57
See application file for complete search history.

(56) References Cited

U.S. PATENT DOCUMENTS 3,085,798 A * 4/1963 Gavette ........................... 269/17
3,669,801 A * 6/1972 Jarvis et al. ................... 156/383
(Continued)

FOREIGN PATENT DOCUMENTS

CN 1051520 4/2000
DE 19503939 C1 * 6/1996 .............. B29C 70/32
(Continued)

OTHER PUBLICATIONS

German Office Action for DE 10 2008 040 213.3 dated Dec. 6, 2010.
(Continued)

*Primary Examiner* — Essama Omgba
(74) *Attorney, Agent, or Firm* — Jenkins, Wilson, Taylor & Hunt, P.A.

(57) ABSTRACT

A method and an apparatus for carrying out the method for installing an especially dome-shaped pressure bulkhead on a one-piece, substantially conical rear section for an aircraft, wherein said rear section includes a connection area and an end area. The method involves the steps of horizontally accommodating a prefabricated rear section in a horizontal support; inserting the rear section into a pivoting frame; pivoting the rear section into a vertical position using the pivoting frame, wherein the connection area of the rear section points upward; horizontally placing and centering the pressure bulkhead on the connection area, and joining the pressure bulkhead with the rear section in the area of the connection area.

17 Claims, 4 Drawing Sheets

(51) Int. Cl.
  *B25B 27/14* (2006.01)
  *B23Q 3/00* (2006.01)
  *B64C 1/10* (2006.01)
  *B21J 15/14* (2006.01)
  *B64C 1/06* (2006.01)
  *B64F 5/00* (2006.01)

(52) U.S. Cl.
  CPC .......... *B64F 5/0009* (2013.01); *B23P 2700/01* (2013.01); *B64C 2001/0072* (2013.01); *Y02T 50/433* (2013.01); *Y10T 29/49826* (2015.01); *Y10T 29/49895* (2015.01); *Y10T 29/49966* (2015.01); *Y10T 29/53417* (2015.01); *Y10T 29/53913* (2015.01); *Y10T 29/53961* (2015.01); *Y10T 29/53974* (2015.01)

(56) References Cited

U.S. PATENT DOCUMENTS

| | | | | |
|---|---|---|---|---|
| 3,669,807 | A | * | 6/1972 | Jarvis et al. ............... 156/581 |
| 3,669,811 | A | * | 6/1972 | Jarvis et al. ............... 156/475 |
| 4,066,231 | A | * | 1/1978 | Bahner et al. .............. 248/552 |
| 4,259,776 | A | * | 4/1981 | Roda ............................ 29/423 |
| 4,531,720 | A | * | 7/1985 | Soder ............................ 269/71 |
| 4,723,769 | A | * | 2/1988 | Nilsson ......................... 269/58 |
| 4,728,059 | A | * | 3/1988 | Stephen et al. ............. 244/119 |
| 4,767,109 | A | * | 8/1988 | Raketich ....................... 269/61 |
| 5,062,589 | A | * | 11/1991 | Roth et al. ................ 244/117 R |
| 5,177,854 | A | * | 1/1993 | Herbert et al. ............. 29/407.08 |
| 5,681,033 | A | | 10/1997 | Bullen |
| 5,692,704 | A | * | 12/1997 | Buttgereit et al. .......... 244/119 |
| 5,820,077 | A | * | 10/1998 | Sutliff et al. ............... 244/119 |
| 5,899,412 | A | * | 5/1999 | Diorio et al. ............... 244/119 |
| 5,908,175 | A | * | 6/1999 | Magnes ....................... 244/119 |
| 5,934,616 | A | | 8/1999 | Reimers et al. |
| 6,372,079 | B1 | * | 4/2002 | Coninck et al. ............ 156/304.2 |
| 6,378,805 | B1 | * | 4/2002 | Stephan et al. ............. 244/119 |
| 6,575,443 | B2 | * | 6/2003 | Kick .............................. 269/75 |
| 6,874,324 | B2 | * | 4/2005 | Sekihara et al. .............. 60/798 |
| 7,562,845 | B2 | * | 7/2009 | Schoene ..................... 244/119 |
| 8,177,166 | B2 | * | 5/2012 | Haack ......................... 244/119 |
| 2002/0007548 | A1 | | 1/2002 | Stoewer et al. |
| 2003/0020226 | A1 | * | 1/2003 | Kick .............................. 269/75 |
| 2003/0217548 | A1 | * | 11/2003 | Sekihara et al. .............. 60/272 |
| 2005/0235479 | A1 | * | 10/2005 | Allen et al. .................... 29/596 |
| 2006/0231682 | A1 | | 10/2006 | Sarh |
| 2006/0284047 | A1 | | 12/2006 | Spishak et al. |
| 2008/0099611 | A1 | * | 5/2008 | Martino Gonzalez et al. ........................... 244/119 |
| 2010/0139077 | A1 | * | 6/2010 | Linzell ......................... 29/525 |
| 2010/0243806 | A1 | * | 9/2010 | Vera Villares et al. ........ 244/119 |
| 2011/0101163 | A1 | * | 5/2011 | Haack ......................... 244/119 |
| 2011/0198443 | A1 | * | 8/2011 | Noebel et al. ............... 244/119 |
| 2011/0290940 | A1 | * | 12/2011 | Noebel et al. ............... 244/121 |
| 2012/0186062 | A1 | * | 7/2012 | Vera Villares et al. ......... 29/428 |

FOREIGN PATENT DOCUMENTS

GB    2196922 A    5/1988
WO    WO 2010003818 A2 *    1/2010    ............... B64C 1/10

OTHER PUBLICATIONS

International Search Report for PCT/EP2009/057812 dated Mar. 5, 2010.

Chinese Office Action for Application No. 2009801266264 dated Jun. 27, 2013.

Chinese Office Action for Application No. 2009801266264 dated Nov. 2, 2012.

* cited by examiner

METHOD FOR INSTALLING A DOME-SHAPED PRESSURE BULKHEAD IN A REAR SECTION OF AN AIRCRAFT, AND DEVICE FOR CARRYING OUT THE METHOD

CROSS-REFERENCE TO RELATED APPLICATIONS

This application is a continuation of PCT/EP2009/057812 filed Jun. 23, 2009 and claims the benefit of U.S. Provisional Application No. 61/134,141, filed Jul. 7, 2008 and German Patent Application No. 10 2008 040 213.3, filed Jul. 7, 2008, the entire disclosures of which are herein incorporated by reference.

FIELD OF THE INVENTION

The invention relates to a method for assembling a dome-shaped pressure bulkhead on a one-piece, substantially conical tail section of an aircraft, the tail section having a connection region and an end region.

The invention also relates to a device for implementing the method.

Nowadays, tail sections of aircraft are usually produced with at least two shells. In order to achieve the required pressure tightness of the aircraft fuselage cell, the tail sections are closed rearwards by a pressure bulkhead which in most cases is dome-shaped. In conventional shell construction, the tail section to be produced is formed by successively adding tail section shells onto the pressure bulkhead which usually stands upright during assembly. Due to the circular addition of the shell segments to the connection region of the pressure bulkhead to produce the tail section, a tolerance compensation can easily be made to compensate for differences in dimensions, which are unavoidable in terms of manufacturing engineering, of the pressure bulkhead or of the connection region of the tail section.

To achieve further reductions in weight, composite materials, in particular CFRP materials, are used to an increasing extent in modern aircraft construction to produce the tail section and other fundamental structural components. In order to further increase the weight reduction potential of the core composite materials by reducing the number of connecting welds, the known shell construction method is no longer used in an increasing number of cases. Instead, for example, complete tail sections are produced in one piece from CFRP materials in the winding method or in a TFP laying process.

However, due to the one-piece formation of the tail section, a tolerance compensation, as usually occurred hitherto in the shell construction method, is no longer possible during the integration of a pressure bulkhead into a CFRP tail section. Furthermore, the installation of an upright pressure bulkhead becomes complex in terms of manufacturing engineering, as different working heights, inter alia, result as a function of the peripheral position on the fuselage section.

SUMMARY OF THE INVENTION

The object of the invention is to provide a method which is simple in manufacturing engineering terms and which allows a pressure bulkhead to be integrated into a prefabricated, already cured, one-piece tail section for a pressure-tight aircraft fuselage cell with tolerance compensation. A further object of the invention is to provide a device for implementing the method.

This object is firstly achieved by a method which comprises the following steps:
a) horizontally receiving a prefabricated tail section in a horizontal placement area,
b) introducing the tail section into a swivel frame,
c) swivelling the tail section using the swivel frame into a vertical position, with the connection region of the tail section pointing upwards,
d) horizontally positioning and centring the pressure bulkhead on the connection region, and
e) joining the pressure bulkhead to the tail section in the area of the connection region.

In step a), a prefabricated tail section is accommodated in a horizontal placement area (so-called cradle) in a pre-assembly station. This is preferably a tail section which is produced in one piece using a CFRP material and which forms the rear termination of the aircraft fuselage cell. While the tail section is held in the horizontal placement area, additional assembly operations can be carried out on the tail section, for example the attachment of metal fittings to connect the rudder units and/or the horizontal tail plane to the tail section. Holes required for this purpose are made very precisely using a suitable drilling means. The drilling means in the region of the pre-assembly station can be formed, for example using a known articulated robot having at least six degrees of freedom, the drilling tool being attached to the articulated arm thereof. Furthermore, it is conceivable for further working steps to be carried out on the tail section, for example pre-finishing operations with the necessary line systems or the like, because when the dome-shaped pressure bulkhead has been integrated it is difficult to access the interior of the tail section. The prefabricated tail section is brought into the horizontal placement area by a suitable lifting means, for example by an overhead crane.

In step b), the tail section prepared thus is introduced by the lifting means into a swivel frame inside a joining station. The swivel frame and thus the tail section are initially still in a horizontal position. Further drilling operations, for example, can be carried out in this horizontal position. To be mentioned in this connection is, for example, the very precise introduction of holes into the rudder unit metal fittings which were attached in step a). The drilling means inside the joining station is preferably configured as a gantry drilling means which is arranged displaceably above the swivel frame or alternatively below the swivel frame. The gantry drilling means is preferably guided on at least two mutually parallel rails and can be positioned with great accuracy. The gantry drilling means makes it possible to position a drilling tool with great accuracy in all three spatial directions. The tail section in the joining station is then brought into a vertical position by the swivel frame so that a connection region or a connection cross section of the tail section to which the pressure bulkhead is connected is directed upwards, while an end portion of the conical tail section usually with significantly smaller cross-sectional dimensions is directed downwards. The swivel frame can also be configured such that a rotation of the tail section about the longitudinal axis is also possible.

As a result of the horizontal assembly position of the pressure bulkhead, on the one hand the assembly process is simplified, since the working height is always independent of the respective peripheral position of the joining operations to be carried out on the tail section. Furthermore, an inherent deformation, caused by gravity, of the cross-sectional shape of the tail section is avoided and the pressure bulkhead which is preferably configured to be self-centring can easily be inserted and positioned in a "floating" manner inside the connection region of the tail section.

For later attachment of the pressure bulkhead, in step c) a transverse butt strap formed by at least two segments is firstly mounted in the connection region of the tail section, the tail section being in the vertical position. The transverse butt strap is preferably attached by riveting or screwing. Alternatively, any other joining methods can be used, for example welding, compression or adhesive bonding.

Only in step d) is the pressure bulkhead positioned and aligned in a substantially horizontal position on the connection region with the circumferential transverse butt strap, resulting in the advantages in terms of manufacturing engineering mentioned at the outset. To accelerate the processing times, at least portions of the pressure bulkhead were provided in a separate pressure bulkhead construction area with a circumferential edge angle for the later mechanical connection of the pressure bulkhead. The edge angle is formed by at least two interconnected edge angle segments corresponding to the annular former. The term "alignment" in this context means the placement or the centring of the pressure bulkhead with respect to the connection region of the tail section.

In step e), the pressure bulkhead is connected to the tail section in the connection region, likewise in a horizontal position. In this respect, an annular former which has been prefabricated in an annular former construction area is placed and positioned or aligned on the installed pressure bulkhead.

Finally, the connections which are still required between the annular former, the pressure bulkhead (edge angle) and the transverse butt strap are produced inside the connection region of the tail section by riveting, screwing, compression, adhesive bonding or the like, sealants simultaneously being introduced to produce a pressure-tight seal between the pressure bulkhead and the tail section.

An advantageous development of the method provides that after the tail section has been received in the horizontal placement area, at least one metal fitting, in particular a rudder unit metal fitting is attached to the tail section.

By this measure, the method makes it possible for the tail section to be fitted out with further structural components in addition to the mere integration of the pressure bulkhead. Structural components of this type are, for example, the rudder unit metal fittings, metal fittings for the connection of the tail plane to the tail section and attachment members for an alternative electrical energy supply unit of the aircraft inside the tail section (so-called "auxiliary power unit" or APU). Furthermore, lines for the necessary infrastructure of the aircraft, for example electrical lines, hydraulic lines, water and waste water lines as well as air conditioning and ventilation lines, can at least be pre-assembled. The pre-assembly of these components is advantageously carried out in this step, as it is easy to access the interior of the tail section in particular because the pressure bulkhead has still not been integrated at this stage.

A further embodiment of the method provides that the annular former required in the transverse weld region for attaching the pressure bulkhead is pre-assembled in an annular former construction area.

This annular former construction area can be disposed externally or alternatively can also be arranged inside the device used for implementing the method. An internal arrangement of the annular former construction area in particular provides a further increase in efficiency when the method is implemented, since a high temporal parallelisation of the production process is achieved at the same time as short transportation distances. The integration of the annular former is preferably concluded at the latest at the time when the fuselage section is transferred from the horizontal pre-assembly position in the horizontal placement area into the swivel frame inside the joining station and is sufficiently prepared for the integration of the pressure bulkhead.

The integration of the annular former inside the external or internal annular former construction area preferably also takes place in a horizontal position in a supporting device which allows a precise positioning, gauging and optionally also a tolerance compensation between the annular former segments to be joined together in order to achieve an optimum fitting accuracy relative to the connection region of the tail section, which makes any compensating measures unnecessary (so-called "shim"-free connection).

A further development provides that the pressure bulkhead is also pre-assembled in a pressure bulkhead construction area, in other words the edge of the pressure bulkhead is connected over the entire periphery to an edge angle composed of a plurality of edge angle segments.

This measure also provides a high temporal parallelisation of the method and thus a short processing time of the tail section up until the complete integration of the pressure bulkhead. During the attachment of the edge angle, the pressure bulkhead is in a horizontal position in a suitable supporting device corresponding to the annular former.

The object according to the invention is also achieved by a device comprising the following features:
a) at least one pre-assembly area with at least one horizontal placement area as well as at least one joining station with at least one swivel frame,
b) at least one drilling means, in particular at least one gantry drilling means, and
c) at least one pressure bulkhead construction area.

A supplied tail section is initially mounted in the horizontal seat of the pre-assembly area so that fitting-out operations which may be required can be carried out. An example of this is the introduction of attachment holes for the rudder unit metal fittings or the tail plane metal fittings and the subsequent attachment of the metal fittings by riveting or screwing. For this purpose, the pre-assembly area has, for example, an articulated robot, a suitable drilling means being attached to the articulated arm thereof. Furthermore, a fully automatic riveting means can be provided inside the assembly area.

In addition thereto, the device has at least one joining station with a swivel frame in which the integration of the pressure bulkhead is completed. The joining station is also equipped with a high-precision drilling means which can be, for example, a parallel displaceable gantry drilling means. At the same time, the joining station preferably has a fully automatic riveting means. The gantry drilling means can introduce with great precision attachment holes, for example, into the rudder unit metal fittings and tail plane metal fittings which are attached inside the pre-assembly area.

Furthermore, the device has at least one pressure bulkhead construction area and at least one external or internal annular former construction area. Inside the pressure bulkhead construction area, an externally supplied pressure bulkhead is initially mounted horizontally in a suitable seat or cradle and then provided with a circumferential edge angle. At the same time, an annular former which is required for the attachment of the pressure bulkhead is integrated in the annular former construction area. The pressure bulkhead construction area can also have means for producing the pressure bulkhead using CFRP materials in the winding method or in the TFP laying process. The pre-assembly area, the pressure bulkhead construction area, the joining station as well as the annular former construction area can be equipped with combined automatic drilling and riveting machines as joining means.

The annular former construction area is preferably arranged outside the assembly line or the entire device, but in an alternative embodiment, it can also be provided inside the device (so-called internal annular former construction area). In the annular former construction area, the annular former is joined together with a plurality of annular former segments which are likewise received and mounted in a suitable horizontal seat.

During the operating sequence according to the method, the fuselage section is transferred by a suitable lifting means from the pre-assembly area into the swivel frame of the joining station. The lifting means which can be configured, for example, as a conventional overhead crane makes it possible to freely position the tail section spatially, the pre-assembly area, the joining station, the pressure bulkhead construction area and the annular former construction area being located inside the region covered by the lifting means. According to the invention, the swivel frame allows the fuselage section to swivel about a transverse axis into a vertical position to facilitate the assembly of the pressure bulkhead on the connection region of the tail section. Furthermore, the swivel frame can be configured such that it is also possible for the tail section to pivot about its longitudinal axis (i.e. parallel to the longitudinal axis of the aircraft). The device preferably has in each case at least three pre-assembly areas, three joining areas, three annular former construction areas and three pressure bulkhead construction areas in order to achieve a sufficiently short processing time by temporal parallelisation when the pressure bulkhead is integrated. However, the provision of only one lifting means and one gantry drilling means inside the entire assembly device is usually sufficient, whereas each pre-assembly area is preferably equipped at least with one automatic drilling and riveting means.

Further advantageous embodiments of the method and device are set out in the further claims.

DESCRIPTION OF EXEMPLARY EMBODIMENTS

Figure 1:
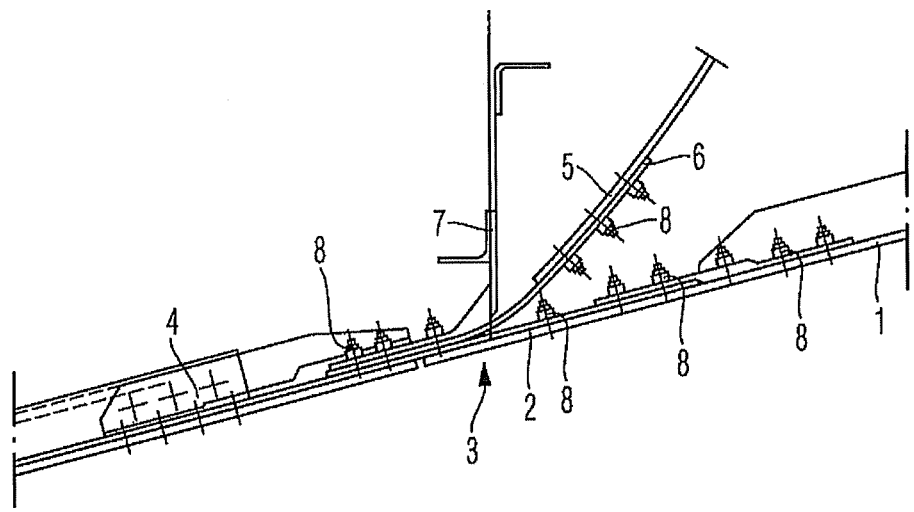
FIG. 1 is a cross-sectional view through a connection region of a tail section with a further fuselage section added on, FIG. 2 is a perspective view of a tail section with a pressure bulkhead.

In the drawings, like constructional components have like reference numerals in each case.

FIG. 1 is a sectional view through a connection region of a tail section with a further fuselage section added on.

A tail section 1 is provided with a circumferential transverse butt strap 2 which forms a connection region 3 for attaching a further fuselage section 4. The connection region 3 can, in principle, have any curved shape which is optionally also locally variable, but is preferably at least circular, elliptic and/or oval in portions. A substantially dome-shaped pressure bulkhead 5 is provided with a circumferential edge angle 6. The actual connection between the fuselage section 4 and the tail section 1 is formed by the transverse butt strap 2. Positioned on the transverse butt strap 2 are the edge angle 6 of the pressure bulkhead 5 and an annular former 7 which, while cooperating, ensure the mechanical connection of the pressure bulkhead 5 in the connection region 3 of the tail section 1. All the mentioned components are interconnected at least to some extent by a plurality of attachment elements, in particular rivets 8 or screws.

Figure 2:
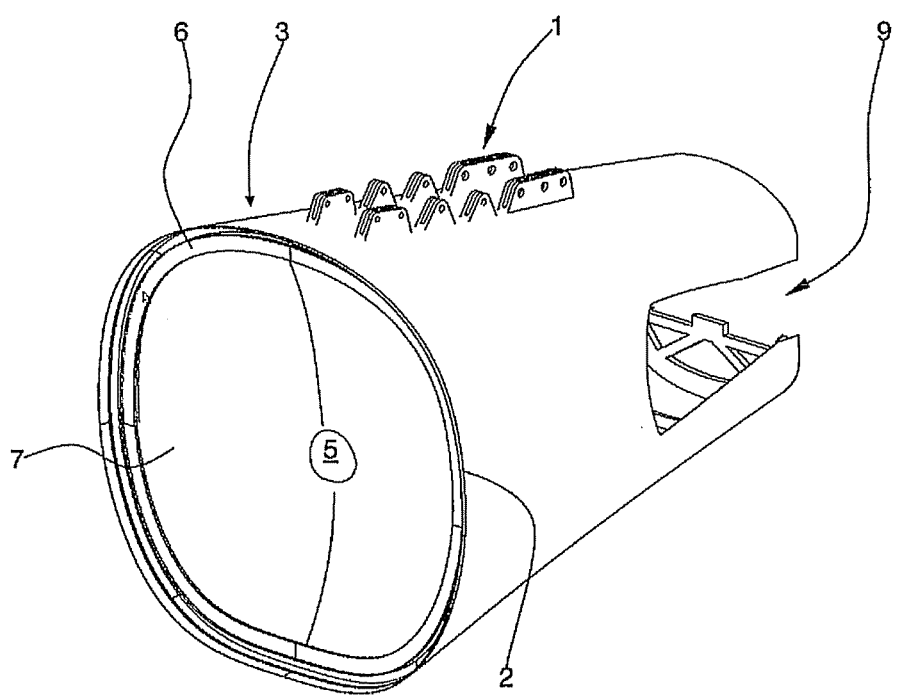

FIG. 2 is a perspective view of the tail section with the pressure bulkhead. To improve clarity, a quadrantal annular former segment has been omitted from FIG. 2.

The approximately dome-shaped pressure bulkhead 5 is mounted in the connection region 3 of the tail section 1. The pressure bulkhead 5 is connected mechanically by the circumferential edge angle 6, while the tail section 1 is coupled with the subsequent fuselage section 4 (not shown in FIG. 2) by means of the transverse butt strap 2. The connection region 3 of the tail section 1 has an approximately circular cross-sectional shape. A cross-sectional shape of the end region 9 of the tail section 1 is approximately the same as that of the (front) connection region, but in comparison has a significantly smaller cross-sectional area. Thus, a superficial shape of the tail section 1 approximately corresponds to that of a truncated cone or a cone.

Figure 3:
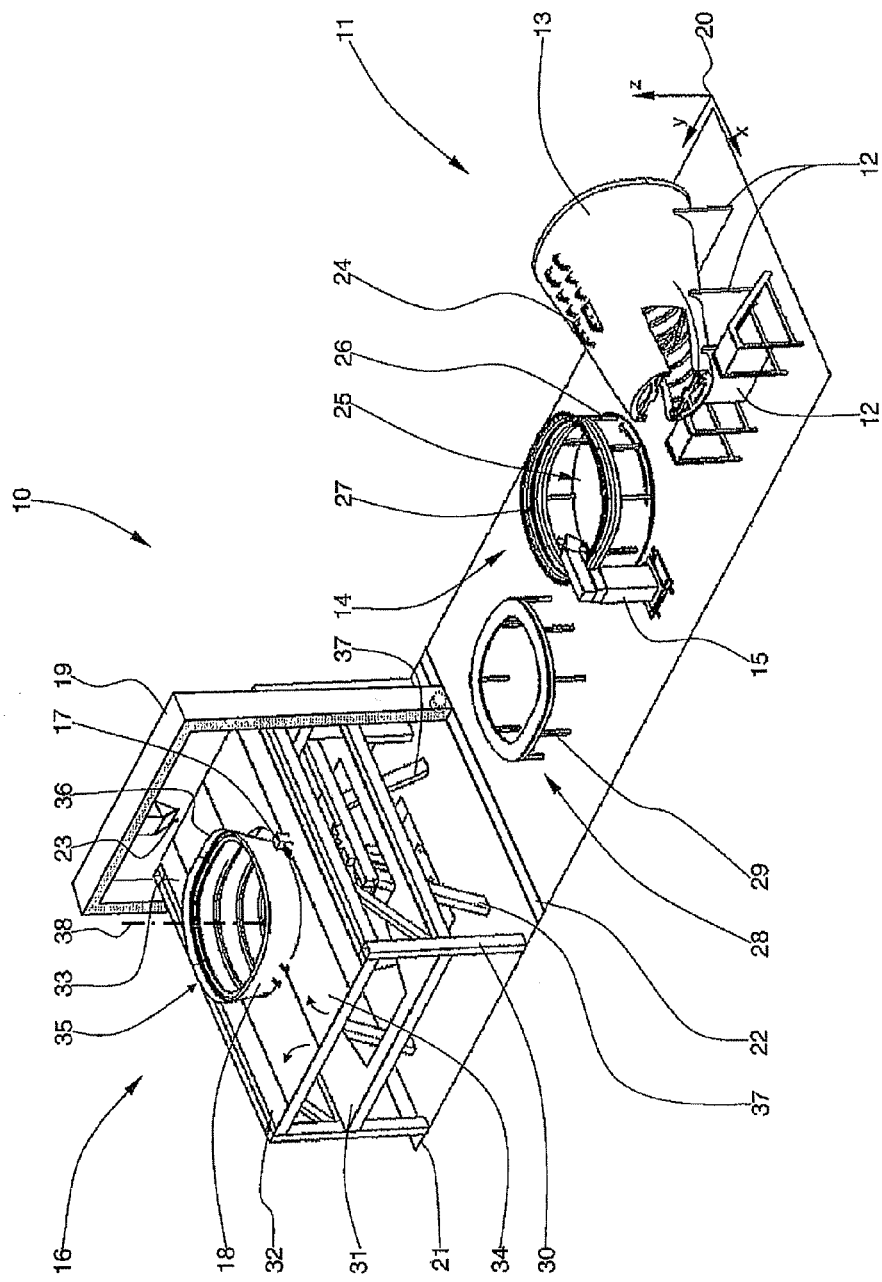
FIG. 3 is a perspective view of a variant of a device.

FIG. 3 illustrates a first variant of a device for implementing the method according to the invention.

A device 10 comprises, inter alia, a pre-assembly area 11 with a horizontal placement area 12 for a tail section 13 in a horizontal position, a pressure bulkhead construction area 14 with a preferably combined drilling and riveting means 15 and a joining station 16 with a swivel frame 17 for receiving a further tail section 18 and a gantry drilling means 19. A coordinate system 20 with an x-axis, a y-axis and a z-axis indicates the spatial position of all the components.

The gantry drilling means 19 is guided displaceably on two rails 21, 22 parallel to the x-axis of the coordinate system 20. A preferably combined drilling and riveting means and/or screw tool 23 which is arranged on the gantry drilling means 19 can be freely positioned spatially parallel to all axes of the coordinate system 20. Thus, the gantry drilling means can simultaneously also insert the rivets or optionally the connection screws in addition to making the holes required for the production of the riveted joint.

Rudder unit metal fittings 24, for example, can be attached to the tail section 13 located in the pre-assembly area 11 by a further, preferably combined and fully automatic drilling and riveting means (not shown in FIG. 3). Furthermore, tail plane metal fittings and/or attachment members for the additional energy supply ("auxiliary power unit") can also be installed in the tail section 13. It is also possible for all the electrical and hydraulic lines, including the necessary air conditioning, water and waste water lines for the required infrastructure of the aircraft, to be installed in the tail section 13. As far as possible, all the pre-finishing operations are preferably carried out on the tail section 13 in the region of the pre-assembly area 11, because access to the tail section 13 is greatly restricted after the pressure bulkhead has been assembled. During the pre-finishing procedure, the tail section 13 is in the illustrated horizontal position on the horizontal placement area 12 which can be adapted to different tail sections 13 of a large number of types of aircraft.

The pressure bulkhead 25 is preferably prepared for assembly in the pressure bulkhead construction area 14 at the same time as and in parallel with the pre-finishing of the tail section 13. During the pre-assembly of the pressure bulkhead 25, said pressure bulkhead is supported on a suitable support 26 in a horizontal position, i.e. substantially parallel to the xy-plane of the coordinate system 20. The pressure bulkhead 25 is for example provided with a circumferential edge angle 27 formed by at least two segments, by means of the preferably likewise combined drilling and riveting means 15.

The device 10 also has a buffer 28 with a further support 29 for feeding into the process of the method and temporarily storing a further, not yet prepared pressure bulkhead. Instead of the buffer 28 or also in addition thereto, for example an annular former construction area (not shown) can be provided in which an annular former which consists of a plurality of annular former segments and is usually provided in the connection region between a tail section 13 and a connection section is joined together with annular former couplings immediately inside the device 10. This optional annular former construction area is also preferably equipped with a fully automatic, combined drilling and riveting means. A screw means can naturally also be provided instead of the riveting means.

The joining station 16 has, inter alia, a rack frame 30 which is provided with two working planes 31, 32 which preferably extend parallel to the xy-plane. At least the upper working plane 32 has two flaps 33, 34 with an approximately semi-circular cutout in each case to allow the tail section 18 to be introduced from above into the joining station 16. For this purpose, the flaps 33, 34 can be folded upwards in the direction of the two arrows (not designated). An undesignated spacing between the working planes 31, 32 parallel to the z-axis of the coordinate system 20 is preferably dimensioned such that an employee can walk upright in this region. As an alternative to the variant of the device 10 shown in FIG. 3, the rails 21, 22 for guiding the gantry drilling means 19 can also be arranged in the region of the upper working plane 32 instead of being positioned on a base of the device 10. Different spatial arrangements of the rails 21, 22 and of the gantry drilling means 19 or the combined gantry drilling and riveting means 23 are also possible. The flaps 33, 34 can be fitted with horizontally displaceable elements in order to ensure that the tail section 18 is embraced without any gaps.

The swivel frame 17 can swivel or tilt (transversely to the longitudinal axis of the tail section) the tail section 18 about a rotational axis extending parallel to the y-axis into the vertical position according to the invention for the integration of the pressure bulkhead. In this respect, a connection region 35 of the tail section 18 is directed upwards, while an end region of the tail section 18 is directed downwards. In the vertical assembly position, illustrated in FIG. 3, of the tail section 18 which has already been provided with a circumferential transverse butt strap 36, the installation of the prepared pressure bulkhead 25 is completed.

The vertical assembly position of the tail section 18 for the integration of the pressure bulkhead 25 means that the operating sequences are simplified compared to the previous assembly method, since a working height between the connection region 35 and the upper working plane 32 is independent of the respective radial working position on the tail section 18. Furthermore, gravity-induced changes in the cross-sectional shape of the connection region 35 of the tail section 18 are avoided and the pressure bulkhead 25 provided with the edge angle 27 can be "floated" into the connection region in a simple manner from above, i.e. parallel to the z-axis, by a lifting means (not shown) and aligned. The pressure bulkhead 25 is preferably configured such that when it is lowered by the lifting means, it is centred automatically in the connection region 35 of the tail section 18, i.e. it is aligned into the final assembly position.

For installation, the pressure bulkhead 25 which has been prepared in the pressure bulkhead construction area 14 is transferred by the lifting means, which is preferably an overhead or indoor crane, from the pressure bulkhead construction area 14 to the joining station 16, is aligned relative the tail section 18 and then lowered parallel to the z-axis.

Finally, an annular former is also transferred by the lifting means to the joining station 16 and is aligned in relation to the tail section 18 and lowered. Finally, the combined drilling and riveting tool 23 produces a plurality of holes and riveted joints between the edge angle 27 of the pressure bulkhead 25, the transverse butt strap 36, the annular former and the fuselage section to be attached in the connection region 35 to achieve the required connections. Alternatively, immediately after the prepared pressure bulkhead 25 has been aligned, an at least partial connection (fastening) by means of some rivet or screw connections between the transverse butt strap 36 and the edge angle 27 of the pressure bulkhead 25 can be carried out to fix the position.

The swivel frame 17 is accommodated such that it can pivot on a bearing bracket 37 inside the rack frame 30 of the joining station 16. The swivel frame 17 can further be configured such that the tail section 18 is able to rotate about a longitudinal axis 38 of the tail section 18. As a result of this optional rotation possibility, holes can for example also be made very precisely in tail plane metal fittings which are already on the tail section 18.

After the pressure bulkhead 25 has been integrated into the connection region 35 of the tail section 18, said tail section can be brought in turn into a horizontal position by the swivel frame 17. In this position, holes can be drilled very precisely by the combined drilling and riveting means 23, for example into the rudder unit metal fittings which are attached in the pre-assembly area 11. Furthermore, additional finishing procedures can also be carried out on the tail section 18 in the joining station 16. Alternatively, the metal fittings can be drilled before the pressure bulkhead 25 is integrated into the connection region 35 of the tail section 18.

All the components, of the dome or pressure bulkhead assembly device described above, in particular the preferably combined drilling and riveting means 15, the preferably combined drilling and riveting means 19 in the gantry mode of construction, the tool 23 of the gantry drilling means 19, the lifting means and the swivel frame 17 in the joining station 16 are controlled by a complex control and regulating means (not shown in the drawings), so that a substantially operator-free, fully automatic, time- and cost-saving operation is possible. Instead of the gantry mode of construction of the drilling means 19, it is also possible to use standardised articulated robots with at least six degrees of freedom to guide the drilling and riveting tools required inside the pressure bulkhead construction area 14 and the joining station 16.

Figure 4:
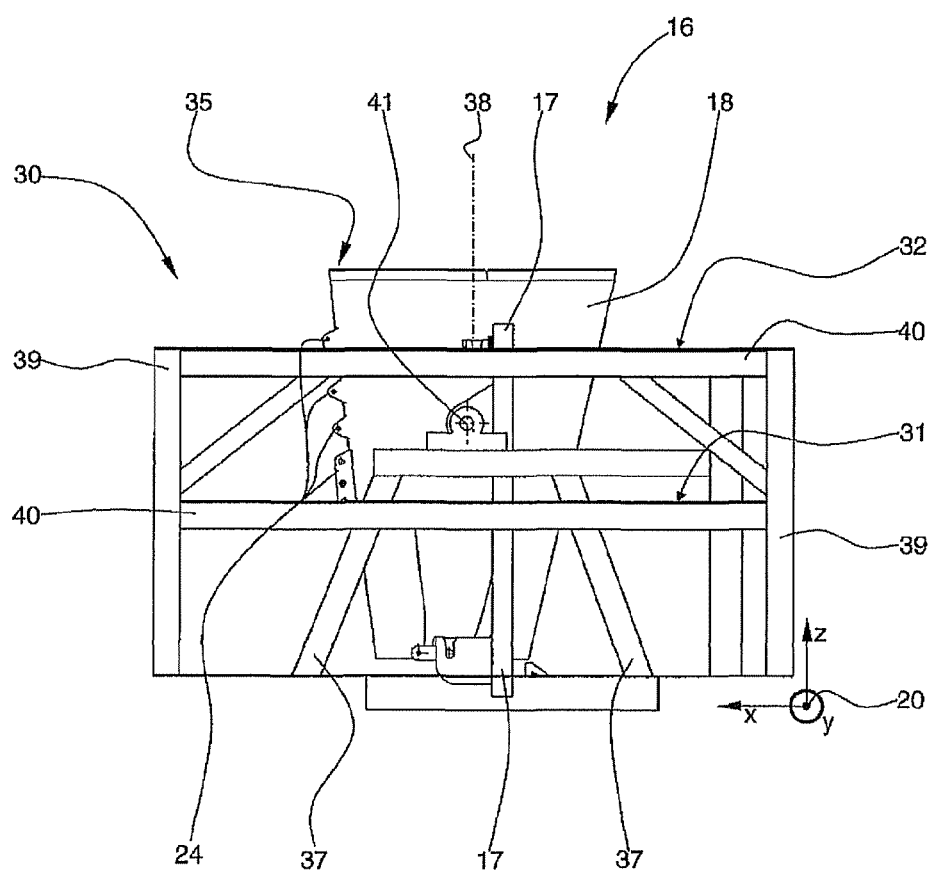
FIG. 4 is a side view of a joining station with a swivel frame arranged therein for mounting the tail section.

FIG. 4 illustrates a simplified side view of the joining station with the tail section accommodated in the swivel frame, the gantry drilling means having been omitted to improve the clarity of the drawing. The pressure bulkhead is installed according to the method in the vertical position of the tail section 18 shown in FIG. 4.

The rack frame 30 of the joining station 16 is formed by a plurality of vertical struts 39 which, with a plurality of horizontal struts 40, serve as a support for the working planes 31, 32 and are latticed together for reinforcement purposes. Inside the rack frame 30, the swivel frame 17 is mounted on the bearing bracket 37 and on a further concealed bearing bracket such that it can swivel about a rotational axis 41 which extends parallel to the y-axis of the coordinate system 20. In addition, the swivel frame 17 advantageously also allows a complete rotation of the tail section 18 about the longitudinal axis 38. In the illustrated position, the pressure bulkhead 25 (also not shown) is connected to the connection region 35 of the tail section 18.

If the tail section 18 is swivelled to the right by approximately 90° about the x-axis, the rudder unit metal fittings 24 are easily accessible from above in an upper position, so that holes can be made with the required accuracy in the rudder unit metal fittings by the gantry drilling means 19 (not shown in FIG. 4). By rotating the tail section 18 about the longitudinal axis 38 by an angle of ±90°, tail plane metal fittings which have already been attached to the sides of the tail section 18 can also optionally be brought into this drilling position and can be drilled very accurately by the gantry drilling means 19.

LIST OF REFERENCE NUMERALS 1 tail section
2 transverse butt strap
3 connection region (tail section)
4 subsequent fuselage section
5 pressure bulkhead
6 edge angle (pressure bulkhead)
7 annular former
8 rivet
9 end region (tail section)
10 device
11 pre-assembly area
12 horizontal placement area
13 tail section
14 pressure bulkhead construction area
15 drilling and riveting means (pressure bulkhead construction area)
16 joining station
17 swivel frame
18 tail section
19 gantry drilling means
20 coordinate system
21 rail
22 rail
23 tool (gantry drilling means)
24 rudder unit metal fitting
25 pressure bulkhead
26 support (pressure bulkhead)
27 edge angle
28 buffer
29 support (pressure bulkhead)
30 rack frame
31 working plane (lower)
32 working plane (upper)
33 flap
34 flap
35 connection region (tail section)
36 transverse butt strap (tail section)
37 bearing bracket (swivel frame)
38 longitudinal axis (tail section)
39 vertical strut
40 horizontal strut
41 pivot axis (tail section)

The invention claimed is:

1. A method for assembling a dome-shaped pressure bulkhead on a one-piece, substantially conical tail section for an aircraft, wherein the tail section has a connection region and an end region, the method comprising:
a) connecting an edge angle formed by a plurality of edge angle segments to the pressure bulkhead;
b) horizontally receiving a prefabricated tail section in a horizontal placement area, wherein the tail section comprises a longitudinal axis;
c) introducing the tail section into a swivel frame, wherein the tail section is rotatable by the swivel frame about its longitudinal axis from its horizontal position to a vertical position, wherein the swivel frame receives and holds the tail section inside a portion of the frame;
d) swivelling the tail section using the swivel frame from the horizontal position into the vertical position, with the connection region of the tail section pointing upwards
e) horizontally positioning and centering the pressure bulkhead on the connection region; and
f) joining the pressure bulkhead to the tail section in the area of the connection region, wherein a transverse butt strap formed by a plurality of transverse butt strap segments is connected to the connection region of the tail section and the pressure bulkhead is centered and connected to the transverse butt strap, and wherein immediately after horizontally positioning and centering the pressure bulkhead on the connection region the transverse butt strap is partially fastened to the edge angle of the pressure bulkhead to fix the position.

2. The method according to claim 1, wherein the pressure bulkhead is joined together with the tail section by at least one of riveting, screwing, welding, compression, or adhesive bonding.

3. The method according to claim 1, wherein after the tail section has been received in the horizontal placement area, at least one metal fitting is attached to the tail section.

4. The method according to claim 3, wherein the at least one metal fitting is a rudder unit metal fitting.

5. The method according to claim 1, wherein an annular former is prefabricated in an annular former construction area by joining together a plurality of annular former segments by annular former couplings.

6. The method according to claim 1, wherein the pressure bulkhead is connected to the edge angle formed by the plurality of edge angle segments, in a pressure bulkhead construction area.

7. The method according to claim 6, wherein the annular former is positioned horizontally onto the pressure bulkhead and fitted thereon.

8. The method according to claim 6, wherein the transverse butt strap, the edge angle and the annular former are joined together.

9. The method according to claim 1, wherein a plurality of holes are introduced by at least one drilling device.

10. The method according to claim 9, wherein the at least one drilling device is a gantry drill.

11. The method according to claim 1, wherein a respective pressure bulkhead is simultaneously integrated into at least two tail sections.

12. A device for implementing the method according to claim 1, comprising
a) at least one pre-assembly area with at least one horizontal placement area as well as at least one joining station with at least one swivel frame,
b) at least one drilling device, and
c) at least one pressure bulkhead construction area.

13. The device according to claim 12, wherein the at least one drilling device is arranged above or below the at least one swivel frame.

14. The device according to claim 12, wherein at least one lift is provided for freely spatially positioning the at least one tail section.

15. The device according to claim 12, wherein the device comprises at least one annular former construction area in which an annular former is integrated by joining together at least two annular former segments by annular former couplings.

16. The device according to claim 12, wherein the at least one drilling device is a gantry drill.

17. The method according to claim 1, wherein the swivel frame provides two working planes.

\* \* \* \* \*